United States Patent
Yang et al.

(10) Patent No.: US 11,386,191 B2
(45) Date of Patent: Jul. 12, 2022

(54) TRUSTED HARDWARE-BASED IDENTITY MANAGEMENT METHODS, APPARATUSES, AND DEVICES

(71) Applicant: ALIPAY (HANGZHOU) INFORMATION TECHNOLOGY CO., LTD., Zhejiang (CN)

(72) Inventors: Renhui Yang, Hangzhou (CN); Shubo Li, Hangzhou (CN); Yuan Chen, Hangzhou (CN); Wenyu Yang, Hangzhou (CN); Qin Liu, Hangzhou (CN); Qin Xiong, Hangzhou (CN); Sheng Zhang, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/359,487

(22) Filed: Jun. 25, 2021

(65) Prior Publication Data
US 2021/0397688 A1     Dec. 23, 2021

(30) Foreign Application Priority Data
Sep. 15, 2020  (CN) .......................... 202010967516.9

(51) Int. Cl.
*G06F 21/32*     (2013.01)
*G06F 16/27*     (2019.01)
(Continued)

(52) U.S. Cl.
CPC ............ *G06F 21/32* (2013.01); *G06F 16/245* (2019.01); *G06F 16/27* (2019.01); *G06Q 50/265* (2013.01);
(Continued)

(58) Field of Classification Search
CPC ...... G06F 21/32; G06Q 50/265; H04L 9/0894; H04L 9/3247
See application file for complete search history.

(56) References Cited

U.S. PATENT DOCUMENTS 9,635,000 B1 *  4/2017  Muftic .................. H04L 9/3239
10,505,741 B1   12/2019  Conley
(Continued)

FOREIGN PATENT DOCUMENTS

CN       1996955         7/2007
CN    101901318 A       12/2010
(Continued)

OTHER PUBLICATIONS

Wang, J., Wei, S. and Liu, H., Jun. 2019. Decentralized Identity Authentication with Trust Distributed in Blockchain Backbone. In International Conference on Blockchain (pp. 202-210). Springer, Cham. (Year: 2019).*

(Continued)

*Primary Examiner* — James R Turchen
(74) *Attorney, Agent, or Firm* — Fish & Richardson P.C.

(57) ABSTRACT

Embodiments of the present specification disclose trusted hardware-based identity management methods, apparatuses, and devices. One method comprising: determining personal identity information of a user of a trusted hardware; determining hardware identifier information of the trusted hardware; generating a decentralized identifier (DID) binding request based on the personal identity information and the hardware identifier information, wherein the DID binding request is configured to request to establish a corresponding relationship between a DID of the user and the trusted hardware; and sending the DID binding request to a decentralized identity service (DIS).

15 Claims, 4 Drawing Sheets

(51) Int. Cl.
  *G06F 16/245* (2019.01)
  *G06Q 50/26* (2012.01)
  *H04L 9/08* (2006.01)
  *H04L 9/32* (2006.01)

(52) U.S. Cl.
  CPC .......... *H04L 9/0894* (2013.01); *H04L 9/3247* (2013.01); *G06F 2221/2149* (2013.01)

(56) References Cited

U.S. PATENT DOCUMENTS

| | | | | |
|---|---|---|---|---|
| 10,880,089 | B2* | 12/2020 | Brown | H04L 63/12 |
| 2005/0039016 | A1 | 2/2005 | Aissi et al. | |
| 2014/0304836 | A1* | 10/2014 | Velamoor | G06F 21/6209 726/28 |
| 2018/0068097 | A1* | 3/2018 | Collin | H04L 9/3236 |
| 2018/0232394 | A1* | 8/2018 | Danziger | H04L 67/06 |
| 2018/0254898 | A1 | 9/2018 | Sprague et al. | |
| 2019/0035018 | A1* | 1/2019 | Nolan | G06Q 20/3825 |
| 2019/0165943 | A1* | 5/2019 | Chari | H04L 9/30 |
| 2019/0230073 | A1* | 7/2019 | Patel | H04L 63/20 |
| 2019/0333054 | A1* | 10/2019 | Cona | G06F 21/6272 |
| 2020/0026834 | A1* | 1/2020 | Vimadalal | H04L 9/3247 |
| 2020/0067907 | A1* | 2/2020 | Avetisov | H04L 67/145 |
| 2020/0106610 | A1* | 4/2020 | Doddavula | H04L 9/0637 |
| 2020/0145219 | A1* | 5/2020 | Sebastian | H04L 9/3231 |
| 2020/0296140 | A1* | 9/2020 | Buchner | G06F 21/604 |
| 2020/0349276 | A1* | 11/2020 | Murdoch | G06F 21/51 |
| 2020/0380144 | A1* | 12/2020 | Murdoch | G06F 21/64 |
| 2020/0401734 | A1* | 12/2020 | Murdoch | H04L 9/0866 |
| 2020/0403795 | A1* | 12/2020 | Murdoch | H04L 9/0894 |
| 2020/0403810 | A1* | 12/2020 | Murdoch | G06F 7/58 |
| 2021/0075774 | A1* | 3/2021 | Murdoch | G06F 21/60 |
| 2021/0271744 | A1* | 9/2021 | Murdoch | G06F 16/2379 |
| 2021/0271765 | A1* | 9/2021 | Murdoch | G06F 21/6218 |
| 2021/0272120 | A1* | 9/2021 | Murdoch | H04L 9/3239 |
| 2021/0273931 | A1* | 9/2021 | Murdoch | H04L 9/006 |
| 2021/0281411 | A1* | 9/2021 | Murdoch | H04L 63/0846 |
| 2021/0288974 | A1* | 9/2021 | Murdoch | G06F 21/64 |
| 2021/0306151 | A1* | 9/2021 | Murdoch | H04L 63/00 |
| 2021/0312073 | A1 | 10/2021 | Yang et al. | |

FOREIGN PATENT DOCUMENTS

| | | |
|---|---|---|
| CN | 103677935 | 3/2014 |
| CN | 104010044 | 8/2014 |
| CN | 105631322 | 6/2016 |
| CN | 106408486 | 2/2017 |
| CN | 107507091 | 12/2017 |
| CN | 107579979 | 1/2018 |
| CN | 107622385 | 1/2018 |
| CN | 107729745 | 2/2018 |
| CN | 107742189 | 2/2018 |
| CN | 107968709 | 4/2018 |
| CN | 108076011 | 5/2018 |
| CN | 108111604 A | 6/2018 |
| CN | 108471350 | 8/2018 |
| CN | 108616539 | 10/2018 |
| CN | 108632284 | 10/2018 |
| CN | 108881160 | 11/2018 |
| CN | 108932297 | 12/2018 |
| CN | 108985089 | 12/2018 |
| CN | 109101822 A | 12/2018 |
| CN | 109150607 | 1/2019 |
| CN | 109245893 | 1/2019 |
| CN | 109376504 | 2/2019 |
| CN | 109522722 | 3/2019 |
| CN | 109525400 | 3/2019 |
| CN | 109547500 | 3/2019 |
| CN | 109660358 | 4/2019 |
| CN | 109710270 | 5/2019 |
| CN | 109741039 | 5/2019 |
| CN | 109768865 | 5/2019 |
| CN | 109840436 | 6/2019 |
| CN | 109993490 | 7/2019 |
| CN | 110009232 | 7/2019 |
| CN | 110034924 | 7/2019 |
| CN | 110046165 | 7/2019 |
| CN | 110083610 | 8/2019 |
| CN | 110086804 | 8/2019 |
| CN | 110222533 | 9/2019 |
| CN | 110224837 | 9/2019 |
| CN | 110335149 | 10/2019 |
| CN | 110457875 | 11/2019 |
| CN | 110516178 | 11/2019 |
| CN | 110555292 | 12/2019 |
| CN | 110636062 | 12/2019 |
| CN | 110837658 | 2/2020 |
| CN | 110933117 A | 3/2020 |
| CN | 110968743 | 4/2020 |
| CN | 110990804 | 4/2020 |
| CN | 111049660 | 4/2020 |
| CN | 111179067 | 5/2020 |
| CN | 111191268 | 5/2020 |
| CN | 111222157 | 6/2020 |
| CN | 111340627 | 6/2020 |
| CN | 111414599 | 7/2020 |
| CN | 111415157 | 7/2020 |
| CN | 111506662 | 8/2020 |
| CN | 111597565 | 8/2020 |
| CN | 111741036 | 10/2020 |
| CN | 113012008 | 6/2021 |
| WO | WO 2019179535 | 5/2020 |

OTHER PUBLICATIONS

Decentralized Identifiers (DIDs) v1.0: Core architecture, data model, and representations; W3C Working Draft; Sep. 9, 2020; https://www.w3.org/TR/2020/WD-did-core-20200907/ (Year: 2020).*
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
U.S. Appl. No. 17/364,658, filed Jun. 30, 2021, Wenyu Yang.
U.S. Appl. No. 17/362,914, filed Jun. 29, 2021, Qin Liu.
U.S. Appl. No. 17/359,475, filed Jun. 25, 2021, Renhui Yang.
U.S. Appl. No. 17/358,249, filed Jun. 25, 2021, Shubo Li.
U.S. Appl. No. 17/348,975, filed Jun. 16, 2021, Renhui Yang.
U.S. Appl. No. 17/364,602, filed Jun. 30, 2021, Renhui Yang.
U.S. Appl. No. 17/349,764, filed Jun. 16, 2021, Qin Liu.
U.S. Appl. No. 17/359,069, filed Jun. 25, 2021, Yuan Chen.
U.S. Appl. No. 17/359,219, filed Jun. 25, 2021, Yuan Chen.
U.S. Appl. No. 17/359,476, filed Jun. 25, 2021, Wenyu Yang.
Extended European Search Report in European Application No. 21181969.3, dated Dec. 9, 2021, 10 pages.
Gilani et al., "A Survey on Blockchain-based Identity Management and Decentralized Privacy for Personal Data," Brain 2020: 2nd conference on Blockchain Research & Applications for Innovative Networks and Services, Sep. 1, 2020, pp. 97-101.
Trustoverip.org [online], "UiD NUM: DID + DPKI + Mobile Number + Identity Ecosystems + Global Services," Aug. 28, 2020, retrieved on Dec. 1, 2021, retrieved from URL<ttps://wiki.trustoverip.org/download/attachments/71236/UIDNUM%20August%202020%20v.2.pdf?version=1 &modificationDate=1605210159647&api=v2>, 5 pages.
Feng, "Electronic Voting Scheme Based on Trusted Computing Technology," Computer Engineering, Mar. 2012, 38 (6):1-6.
Geng, "Research on Several Secure Multi-Party Computation Problems and Applications," Thesis for the degree of Doctor of Cryptography, Beijing University of Posts and Telecommunications, School of Computer Sciences, May 8, 2012, 110 pages.

* cited by examiner

TRUSTED HARDWARE-BASED IDENTITY MANAGEMENT METHODS, APPARATUSES, AND DEVICES

CROSS-REFERENCE TO RELATED APPLICATIONS

This application claims priority to Chinese Patent Application No. 202010967516.9, filed on Sep. 15, 2020, which is hereby incorporated by reference in its entirety.

TECHNICAL FIELD

The present application relates to the technical field of Internet, and in particular, to trusted hardware-based identity management methods, apparatuses, and devices.

BACKGROUND

In daily life, users usually need to present all kinds of data needed for handling service and prove the credibility of the data presented, so that a service provider can provide corresponding services to users according to the data presented by users. At present, the users usually need to manually present their identity cards to an authority institution when obtaining trusted data needed for the services, so that the authority institution verifies the identity of the users based on the documents presented by the users. If the verification succeeds, the users can be provided with the needed printed data stamped with the official seal of the authority institution.

Based on this, how to provide a more convenient method for managing user identities and data has become an urgent problem to be solved.

SUMMARY

Embodiments of the present specification provide trusted hardware-based identity management methods, apparatuses, and devices.

To solve the previous technical problems, the embodiments of present specification are implemented as follows:

A trusted hardware-based identity management method provided by the embodiments of the present specification includes the following: obtaining personal identity information of a user of trusted hardware; obtaining hardware identifier information of the trusted hardware; generating a decentralized identifiers (DID) binding request based on the personal identity information and the hardware identifier information, where the DID binding request is used for requesting to establish a corresponding relationship between the DID of the user and the trusted hardware; and sending the DID binding request to a decentralized identity service (DIS).

A DID management method provided by the embodiments of the present specification includes the following: obtaining a DID binding request, where the DID binding request is generated based on personal identity information of a user of trusted hardware and hardware identifier information of the trusted hardware, and the DID binding request is used for requesting to establish a corresponding relationship between the DID of the user and the trusted hardware; querying the DID of the user in response to the DID binding request, where the DID of the user is established by the DIS and has a corresponding relationship with the personal identity information of the user; and establishing the corresponding relationship between the DID of the user and the trusted hardware if the DID of the user is identified.

A trusted hardware-based identity management apparatus provided by the embodiments of the present specification includes the following: a first acquisition module, configured to obtain personal identity information of a user of trusted hardware; a second acquisition module, configured to obtain hardware identifier information of the trusted hardware; a request generation module, configured to generate a DID binding request based on the personal identity information and the hardware identifier information, where the DID binding request is used for requesting to establish a corresponding relationship between the DID of the user and the trusted hardware; and a first sending module, configured to send the DID binding request to a DIS.

A DID management apparatus provided by the embodiments of the present specification includes the following: an acquisition module, configured to obtain a DID binding request, where the DID binding request is generated based on personal identity information of a user of trusted hardware and hardware identifier information of the trusted hardware, and the DID binding request is used for requesting to establish a corresponding relationship between the DID of the user and the trusted hardware; a query module, configured to query the DID of the user in response to the DID binding request, where the DID of the user is established by the DIS and has a corresponding relationship with the personal identity information of the user; and a first establishment module, configured to establish the corresponding relationship between the DID of the user and the trusted hardware if the DID of the user is identified.

A trusted data transmission device provided by the embodiments of the present specification includes the following: at least one processor; and a memory communicably coupled to the at least one processor, where the memory stores instructions that can be executed by the at least one processor, and the instructions are executed by the at least one processor, so that the at least one processor can perform the following processes: obtaining personal identity information of a user of trusted hardware; obtaining hardware identifier information of the trusted hardware; generating a DID binding request based on the personal identity information and the hardware identifier information, where the DID binding request is used for requesting to establish a corresponding relationship between the DID of the user and the trusted hardware; and sending the DID binding request to a DIS.

A DID management device provided by the embodiments of the present specification includes the following: at least one processor; and a memory communicably coupled to the at least one processor, where the memory stores instructions that can be executed by the at least one processor, and the instructions are executed by the at least one processor, so that the at least one processor can perform the following processes: obtaining a DID binding request, where the DID binding request is generated based on personal identity information of a user of trusted hardware and hardware identifier information of the trusted hardware, and the DID binding request is used for requesting to establish a corresponding relationship between the DID of the user and the trusted hardware; querying the DID of the user in response to the DID binding request, where the DID of the user is established by the DIS and has a corresponding relationship with the personal identity information of the user; and establishing the corresponding relationship between the DID of the user and the trusted hardware if the DID of the user is identified.

At least one embodiment provided by the present specification can achieve the following beneficial effects:

The DID binding request is generated based on the personal identity information of the user of the trusted hardware and the hardware identifier information of the trusted hardware, and the DID binding request is sent to the DIS to enable the DIS to establish and store the corresponding relationship between the DID of the user and the trusted hardware in a blockchain network, so that the user can manage personal identity and data conveniently and quickly through the trusted hardware.

BRIEF DESCRIPTION OF DRAWINGS

In order to more clearly illustrate the technical solutions in the embodiments of the present specification or in the existing technology, the accompanying drawings needed to be used in the description of the embodiments or the existing technology will be briefly described below. It is clear that the accompanying drawings in the following description are only some embodiments recorded in the present application, and other drawings can be obtained by those skilled in the art based on these drawings without any creative work.

DESCRIPTION OF EMBODIMENTS

In order to make the objectives, technical solutions, and advantages of one or more embodiments of the present specification clearer, the technical solutions of one or more embodiments of the present specification will be clearly and comprehensively described below in combination with specific embodiments and corresponding accompanying drawings of the present specification. It is clear that the described embodiments are only part rather than all of the embodiments of the present specification. On the basis of the embodiments of the present specification, all other embodiments obtained by those of ordinary skill in the art without creative work fall within the scope of protection of one or more embodiments of the present specification.

The technical solutions provided by various embodiments of the present specification are described in detail below with reference to the accompanying drawings.

In the existing technology, users usually need to present data needed for handling service and prove the credibility of the data presented. Therefore, the users usually need to manually present their identity cards, so that the users can be provided with the needed printed data stamped with the official seal of the authority institution if the verification succeeds. It can be seen that the method for requiring the users to manually present identity cards to obtain trusted data has poor use convenience.

Figure 1:
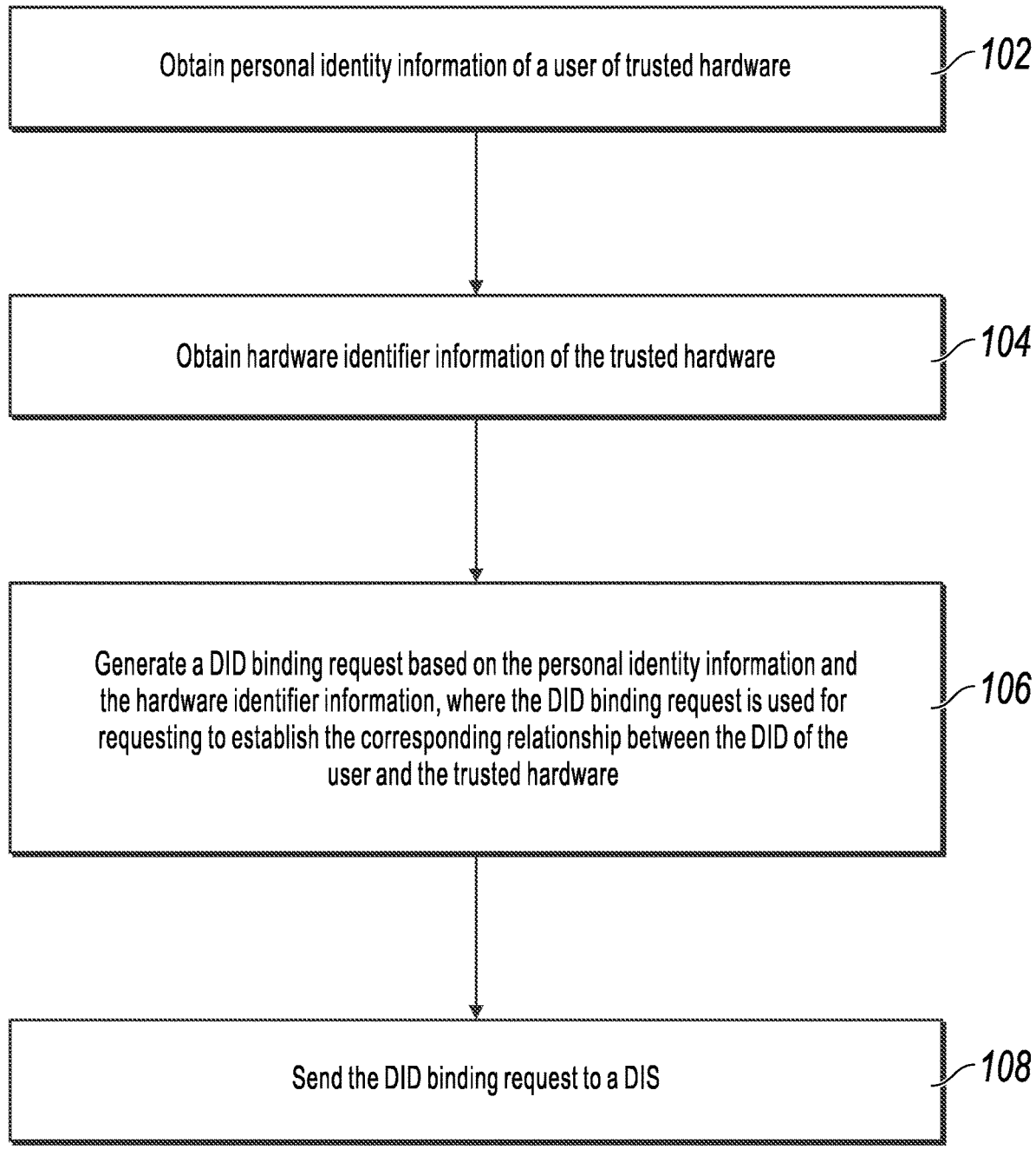
FIG. 1 is a flowchart illustrating a trusted hardware-based identity management method, according to some embodiments of the present specification.

In order to solve the defects in the existing technology, the present solution provides the following embodiments:

FIG. 1 is a flowchart illustrating a trusted hardware-based identity management method, according to some embodiments of the present specification. In view of programs, an executive subject of the process can be trusted hardware, or can be an application client device configured to manage user identity and data, or can also be an application service end configured to manage the user identity and data. In actual application, the present application client device configured to manage the user identity and data can be deployed in the trusted hardware, or can also be deployed outside the trusted hardware, which is not specifically limited. It is only required that the application client device and the application service end configured to manage the user identity and data can be communicably coupled to the trusted hardware. As shown in FIG. 1, the process can include the following steps:

Step 102: Obtain personal identity information of a user of trusted hardware.

In the embodiments of the present specification, if a user needs to manage and control the personal identity and trusted data by using the trusted hardware, a corresponding relationship between the identity information of the user and the trusted hardware needs to be established. Therefore, the personal identity information of the user and hardware identifier information of the trusted hardware can be obtained first, so as to establish the corresponding relationship between the user identity and the trusted hardware based on the previous obtained information.

The trusted hardware is one of the important foundations of trusted computing. A trusted execution environment (TEE) can be constructed on a hardware device based on the trusted hardware, so as to protect program code and data in the trusted hardware from being disclosed and modified, and further protects the privacy and security of the data in the trusted hardware. There are many types of trusted hardware, for example, trusted chips of software guard extensions (SGX) of Intel, and advanced RISC machine (ARM) Trust-Zone. In the embodiments of the present specification, specific models used by the trusted hardware are not specifically limited. The trusted hardware can also include an end-user device, a server, etc. carried with a trusted chips.

The user of the trusted hardware can refer to a user with use permission or ownership of the trusted hardware. The personal identity information of the user can include the information that can determine the identity of the user, for example, identity card number information, household register information, contact information, etc. of the user.

In actual application, Step 102 can be implemented by a plurality of methods. For example, the user can input personal identity information in an application interface of an application used for managing the user identity and data; or the user can collect images of personal ID by using an image collection device; or the user can collect audios, etc. including the personal identity information by using an audio collection device, so that the executive subject of the method in FIG. 1 can obtain the personal identity information of the user, which is not specifically limited.

Step 104: Obtain hardware identifier information of the trusted hardware.

In the embodiments of the present specification, the hardware identifier information of the trusted hardware can refer to the information used for identifying the trusted hardware. The hardware identifier information of the trusted hardware usually needs to be unique and unchanged compared with other trusted hardware. In actual application, the hardware identifier information of the trusted hardware can be the unique identifier information generated for the trusted hardware by a trusted hardware provider, and can also be the unique identifier information generated for the trusted hardware by the application used for managing the user identity and data, which is not specifically limited.

In the embodiments of the present specification, the information stored in the trusted hardware cannot be tampered with, so that the trustworthiness of the data stored in the trusted hardware can be guaranteed. Therefore, the hardware identifier information of the trusted hardware can be stored in the trusted hardware. The executive subject of the method in FIG. 1 can automatically request to obtain the hardware identifier information stored in the trusted hardware conveniently and quickly, and can ensure the trustworthiness of the obtained hardware identifier information of the trusted hardware when the user needs to manage the personal identity and data by using the trusted hardware. Or, the user can also input the hardware identifier information of the trusted hardware in the application interface of the application used for managing the user identity and data, which is not specifically limited.

Step 106: Generate a decentralized identifier (DID) binding request based on the personal identity information and the hardware identifier information, where the DID binding request is used for requesting to establish a corresponding relationship between the DID of the user and the trusted hardware.

In the embodiments of the present specification, a blockchain can be understood as a data chain formed by storing multiple blocks in sequence. The block head of each block includes a time stamp of the block, a harsh value of the information of the previous block, and a harsh value of the information, so that mutual verification between blocks is realized and a tamper-resistant blockchain is formed. Each block can be understood as a data block (a unit for storing data). The blockchain serves as a decentralized database, is a series of data blocks generated by correlating based on a cryptographic method. Each data block includes the information of a network transaction, and is used for verifying the validity of the information of the data block (anti-counterfeiting) and generating the next block. The chain formed by connecting blocks end to end is the blockchain. If the data in a block needs to be modified, then the content of all blocks after the block needs to be modified, and the data backed up by all nodes in the blockchain network needs to be modified. Therefore, the blockchain has the characteristic of difficulty in tempering with and deleting. The blockchain, serving as a method for keeping the integrity of the content, has reliability after the data has been stored in the blockchain.

In the embodiments of the present specification, a decentralized identity service (DIS) can be provided through a blockchain platform. Specifically, a user can request the DIS to establish a personal DID and a decentralized identifiers document (DID Doc) by using an application service end used for managing the user identity and data, and both the DID and the DID Doc of the user can be stored in the blockchain platform, where, the DIS is a blockchain-based identity management solution. The DIS can be connected to the blockchain platform, and provides the functions of creating, verifying, managing, etc. of a digital identity, so as to realize standardized management and protection of entity data, and meanwhile, ensure the authenticity and efficiency of information flow. Moreover, the difficult problems about cross-institution identity verification, data cooperation, etc. can be solved.

Step 108: Send the DID binding request to the DIS, so that the DIS establishes a corresponding relationship between DID of the user and the trusted hardware.

In the embodiments of the present specification, the DIS can store the corresponding relationship between the DID of the user and the hardware identifier information of the trusted hardware in the DID Doc of the user in response to the DID binding request, so as to realize the establishment of the corresponding relationship between the DID of the user and the trusted hardware.

It should be understood that the sequence of part steps in the methods of one or more embodiments of the present specification can be exchanged based on actual needs, or part steps in the methods can also be omitted or deleted.

In the method in FIG. 1, the DID binding request is generated based on personal identity information of a user of trusted hardware and hardware identifier information of the trusted hardware, and the DID binding request is sent to the DIS to enable the DIS to establish and store a corresponding relationship between the DID of the user and the trusted hardware in a blockchain network, so the user manages personal identity and data conveniently and quickly through the trusted hardware.

The embodiments of the present specification further provide some specific implementations of the method based on the method shown in FIG. 1, which are described below.

In the embodiments of the present specification, after step 108 of sending the DID binding request to the DIS, the method further includes the following:

receiving a private key fed back by the DIS, where the private key is a private key in a key pair generated by the DIS for the corresponding relationship, and a public key in the key pair is stored in the DID Doc of the user; and storing the private key in the trusted hardware.

In the embodiments of the present specification, the user can perform digital signature on a user instruction or user data that needs to be sent to other users by using the private key stored in the trusted hardware. Other users can obtain the public key of the user from the blockchain network, so as to verify the signature of the obtained user instruction digital signature or user data digital signature. If the verification succeeds, it can indicate that the user instruction digital signature is an instruction generated with the authorization of the user, or it can indicate that the user data digital signature is the data authenticated by the user, so that other users can verify the trustworthiness of the user instruction and user data sent by the user without showing the personal identity information manually to prove personal identity by the user. Therefore, the user can manage the personal identity and data conveniently and quickly through the trusted hardware.

In actual application, one user ID can establish a corresponding relationship with multiple pieces of trusted hardware, in this case, the DIS only needs to generate different keys for each piece of trusted hardware, so that one user can manage the identity and data by using multiple pieces of trusted hardware, which helps improving user experience.

In the embodiments of the present specification, not only the user can register the personal DID at a DIS system, but the application used for managing the user identity and data can also register the DID of the present application at the DIS.

Therefore, before a DID binding request is generated based on the personal identity information and the hardware identifier information, the method can further include the following:

obtaining application identification information sent by a target application in a process of registering the DID of the target application.

In the embodiments of the present specification, the target application and the application used for managing the user identity and data can be the same application. The application identification information of the target application can refer to the information used for identifying the application as the target application, for example, the unique identifier information of the target application, the unique enterprise identifier information of an enterprise that the target application belongs, etc. where the unique enterprise identifier information to which the enterprise that the target application belongs can be the service license number information of the enterprise, etc. which is not specifically limited. It can be seen that the application identification information of the target application is equivalent to the personal identify information of the user.

In the embodiments of the present specification, in order to facilitate the convenient management of the user to the trusted hardware by using the target application, the step that a DID binding request is generated based on the personal identity information and the hardware identifier information can specifically include the following:

the target application generates the DID binding request based on the personal identity information, the hardware identifier information, and the application identification information, where the DID binding request is used for requesting to establish a corresponding relationship between a target DID of the user and the trusted hardware, and the target DID of the user is the DID registered by the user by using the target application.

In the embodiments of the present specification, there is also a corresponding relationship between the created DID of the user and the DID of the target application when the user establishes personal DID by using the target application. The DID of the user corresponding to the DID of the target application needs to be bound to the trusted hardware when the user binds the corresponding relationship between the trusted application and the DID of the user by using the target application, so that the user manages and controls the personal identity and data by using the target application. In actual application, the user can also create the personal DID by using other applications, as such the created DID of the user corresponds to the other applications. In a similar way, the DID of the user corresponding to the DIDs of other applications can be bound to the trusted hardware when the user binds the corresponding relationship between the trusted application and the DID of the user by using other applications. Details are omitted here for simplicity.

In the embodiments of the present specification, the user may use the trusted data multiple times, so the user needs to go to authority institution many times to request to obtain printed data with an official seal. The operation of the method for using, managing, and controlling the trusted data of the user is cumbersome, which brings inconvenience to the user.

In the embodiments of the present specification, multiple implementations for managing trusted data of a user by using trusted hardware are provided.

Implementation 1

A user can request a trusted application (TAPP) to generate target data by using the trusted hardware, so as to use, manage, and control the target data generated by the TAPP through the trusted hardware.

In the present implementation, after the step that a DIS establishes a corresponding relationship between a DID of a user and trusted hardware, generates a key pair for the corresponding relationship, and stores a private key in the key pair in the trusted hardware, the method can further include the following:

obtaining a data use request sent by a data user, where the data use request is used for requesting to use the target data managed by the user by using the trusted hardware, and the target data is the data obtained by processing user service data of the user at a trusted institution by using the TAPP;

generating use authorization information in response to a use authorization instruction of a use authorization approver of the target data corresponding to the data use request;

performing digital signature on the use authorization information by using the private key to obtain use authorization information digital signature; and sending the use authorization information digital signature to the TAPP.

The TAPP can be run to obtain the user service data of the user from the trusted institution and process the user service data to generate the target data after the verification of the use authorization information digital signature by the TAPP by using a public key obtained from the DID Doc of the user in the blockchain network succeeds.

The TAPP can also give a feedback indicating that a processing result of the target data has been generated to the user and the data user, so that the user and the data user can obtain the target data generated by the TAPP from the TAPP.

The TAPP can refer to the application that runs in the TEE, and the TAPP can process the data obtained from a trusted data source based on a determined computation rule to generate the target data during running. The TAPP runs in the TEE, so that the TAPP and the target data generated by the TAPP have tamper resistance. In addition, the TAPP is used for processing the data obtained from the trusted data source, so as to ensure the trustworthiness of the target data generated by the TAPP. The target data generated by the TAPP is obtained by processing user original service data, so the data user can obtain only the target data rather than the user original data involved in generating the target data, so as to improve the security and privacy of the user original service data.

In actual application, the TAPP can be stored in a trusted hardware, and can also be stored in an application client device or an application service end used for managing the user identity and data, or, can also be stored in a trusted server that is communicably coupled to the client device or the application service end, which is not specifically limited.

Specifically, the TAPP can be executed in a TEE in a target device. The TEE is isolated from an operating system of the target device. The TAPP can obtain user service data of a user from a trusted institution through an interface predefined in code of the TEE, The TAPP can be executed in a TEE that is based on security extension of central processing unit (CPU) hardware, and is isolated from the outside world. At present, industry pays close attention to solutions of the TEE. Almost all mainstream chips and software alliances have their own TEE solutions, for example, a software trusted platform module (TPM), and the Intel software guard extensions (SGX), an advanced RISC machine (ARM) trustzone, and an advanced micro device (AMD) platform security processor (PSP) in the aspect of hardware, etc. The TEE can play a role of a hardware black box. The code and data executed in the TEE cannot be snooped even by an operating system layer, and can only be operated through the interface pre-defined in the code. In terms of efficiency, an operation of plaintext data rather than a complex cryptographic operations of homomorphic encryption is performed in the TEE due to the black box properties of the TEE. There is almost no loss of efficiency in an operation process. Therefore, a program deployed in the TEE obtains the user service data of the user from the trusted institution and processes the obtained user service data, which can satisfy the needs of data privacy on the premise of relatively low performance loss. The trustworthiness of the target data generated by the program deployed in the TEE can be improved because the program and the data in the TEE have tamper resistance, where the trusted institution can refer to an institution that can provide data with high trustworthiness. For example, the trusted institution can include a bank, a tax bureau, an authority credit investigation institution, a commercial platform, etc., where the bank can provide trusted salary statement data, the tax bureau can provide trusted tax payment records, the authority credit investigation institution can provide trusted credit reports, and the commercial platform can provide trusted transaction data of a merchant, etc., which is not specifically limited.

Implementation 2

A user can also pre-store target data that needs to be managed by using trusted hardware to the trusted hardware.

In the present implementation, after the step that a DIS establishes a corresponding relationship between a DID of a user and trusted hardware, generates a key pair for the corresponding relationship, and stores a private key in the key pair in the trusted hardware, the method can further include the following:

obtaining a data use request sent by a data user, where the data use request is used for requesting to use target data of the user stored in the trusted hardware, and the target data stored in the trusted hardware can be the data obtained from a trusted institution;

performing digital signature on the target data by using the private key to obtain target data digital signature in response to a use authorization instruction of a use authorization approver of the target data corresponding to the data use request; and sending the target data digital signature to the data user.

The data user can determine that the target data is indeed the data authenticated by the user after the verification of the target data digital signature by the user by using a public key obtained from a DID Doc in a blockchain network succeeds. The data stored in the trusted hardware cannot be tampered with, so the trustworthiness of the data obtained by the user data can be ensured. Therefore, the user can conveniently and quickly manage and control the use condition of the target data of the user through the trusted hardware.

In the embodiments of the present specification, in order to prevent other users from stealing the trusted hardware, the method in FIG. 1 can further include the following:

obtaining a setting operation of the user for a use authorization verification method of the trusted hardware;

determining the use authorization verification method of the trusted hardware based on the setting operation;

verifying the identity of the current user by using the determined use authorization verification method if operation performed by the current user on the trusted hardware is identified;

responding to the operation if the verification succeeds; and refusing to respond to the operation if the verification fails. Therefore, the other users are prevented from stealing the trusted hardware of the user.

Figure 2:
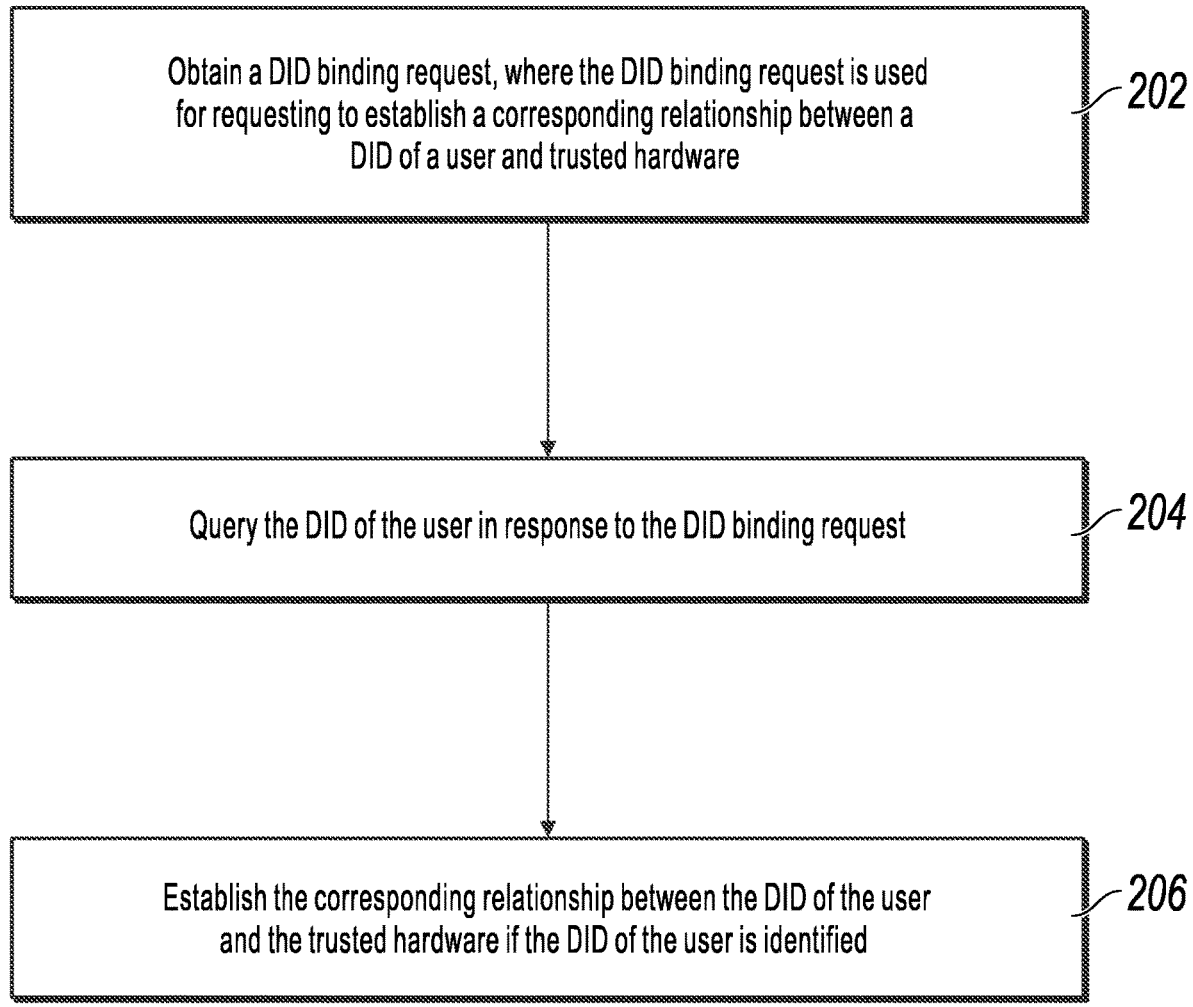
FIG. 2 is a flowchart illustrating a decentralized identifier management method, according to some embodiments of the present specification.

FIG. 2 is a flowchart illustrating a DID management method, according to some embodiments of the present specification, based on the same idea. In view of programs, an executive subject of a process can be a DIS.

As shown in FIG. 2, the process can include the following steps:

Step 202: Obtain a DID binding request, where the DID binding request is generated based on personal identity information of a user of trusted hardware and hardware identifier information of the trusted hardware, and the DID binding request is used for requesting to establish a corresponding relationship between a DID of the user and the trusted hardware.

Step 204: Query the DID of the user in response to the DID binding request, where the DID of the user is established by the DIS and has a corresponding relationship with the personal identity information of the user.

Step 206: Establish the corresponding relationship between the DID of the user and the trusted hardware if the DID of the user is identified. The corresponding relationship between the DID of the user and hardware identifier information of the trusted hardware is stored in a DID Doc of the user.

In actual application, if the DID of the user is not identified by the DIS, then it can also indicate that the DID of the user has not been created, so that the DID of the user can be created first, and then the corresponding relationship between the created DID of the user and the trusted hardware is established.

It should be understood that the sequence of part steps in the methods of one or more embodiments of the present specification can be exchanged based on actual needs, or part steps in the methods can also be omitted or deleted.

In the method in FIG. 2, the DIS can establish and store the corresponding relationship between the DID of the user and the trusted hardware in a blockchain network based on the DID binding request sent by the trusted hardware or the application used for managing user identity and data, so that the user can manage personal identity and data conveniently and quickly through the trusted hardware.

The embodiments of the present specification further provide some specific implementations of the method based on the method of FIG. 2, which are described below.

In the embodiments of the present specification, the step that the DID binding request is obtained can specifically include the following:

obtaining the DID binding request generated by the target application, where the DID binding request is used for requesting to establish a corresponding relationship between a target DID of the user and the trusted hardware, and the target DID is the DID registered by the user by using the target application.

Correspondingly, the step that the DID of the user is queried can specifically include the following: querying the target DID.

The corresponding relationship between the DID of the user and the trusted hardware is established if the DID of the user is identified, so that the user can manage and control the trusted hardware through a target application, and the identity and data of the user are managed conveniently and quickly based on the trusted hardware.

In the embodiments of the present specification, after the step that a corresponding relationship between the DID of the user and the trusted hardware is established, the method can further include the following:

generating a key pair for the trusted hardware;

storing a public key in the key pair in the DID Doc of the user; and sending a private key in the key pair to the trusted hardware, so that the trusted hardware stores the private key.

In the embodiments of the present specification, the private key sent to the trusted hardware can perform digital signature on a user instruction or user data of the user, while the public key can verify the signature of the user instruction or user data that is subjected to digital signature by using the private key. Specific using methods of the key pair can refer to the contents in the embodiments of the method of FIG. 1, which is not specifically limited.

Figure 3:
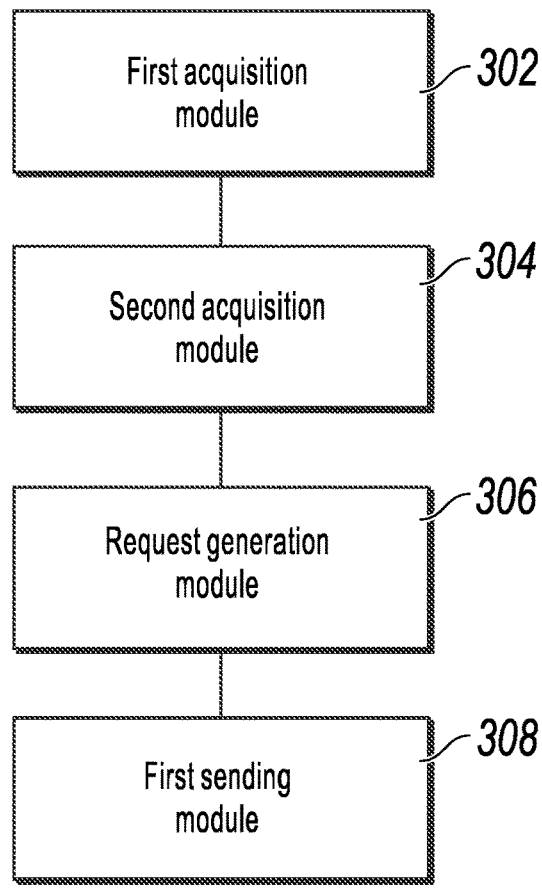
FIG. 3 is a schematic diagram illustrating a trusted hardware-based identity management apparatus corresponding to FIG. 1, according to some embodiments of the present specification.

The embodiments of the present specification further provide an apparatus corresponding to the previous method based on the same idea. FIG. 3 is a schematic diagram illustrating a trusted hardware-based identity management apparatus corresponding to FIG. 1, according to some embodiments of the present specification. As shown in FIG. 3, the apparatus can include the following:

a first acquisition module 302, configured to obtain personal identity information of a user of trusted hardware;

a second acquisition module 304, configured to obtain hardware identifier information of the trusted hardware;

a request generation module 306, configured to generate a DID binding request based on the personal identity information and the hardware identifier information, where the DID binding request is used for requesting to establish a corresponding relationship between a DID of the user and the trusted hardware; and a first sending module 308, configured to send the DID binding request to a DIS.

Optionally, the apparatus in FIG. 3 can further include the following:

a receiving module, configured to receive a private key fed back by the DIS, where the private key is a private key in a key pair generated by the DIS for the corresponding relationship, and a public key in the key pair is stored in a DID Doc of the user; and a storage module, configured to store the private key in the trusted hardware.

Optionally, the apparatus in FIG. 3 can further include the following:

a third acquisition module, configured to obtain application identification information sent by a target application in a process of registering the DID of the target application;

the request generation module can be specifically configured to:

generate the DID binding request by the target application based on the personal identity information, the hardware identifier information, and the application identification information, where the DID binding request is used for requesting to establish a corresponding relationship between a target DID of the user and the trusted hardware, and the target DID of the user is the DID registered by the user by using the target application.

Optionally, the apparatus in FIG. 3 can further include the following:

a fourth acquisition module, configured to obtain a data use request sent by a data user, where the data use request is used for requesting to use target data managed by the user by using the trusted hardware, and the target data is the data obtained by processing user service data of the user at a trusted institution by using a TAPP; specifically, the TAPP is executed in a TEE in a target device; the TEE is isolated from an operating system of the target device; the TAPP obtains the user service data of the user from a trusted institution through an interface predefined in code of the TEE;

an authorization information generation module, configured to generate authorization information in response to a use authorization instruction of a use authorization approver of the target data for the data use request;

a first digital signature module, configured to perform digital signature on the use authorization information by using the private key to obtain use authorization information digital signature; and a second sending module, configured to send the use authorization information digital signature to the TAPP.

Optionally, the apparatus in FIG. 3 can further include the following:

a fifth acquisition module, configured to obtain a data use request sent by a data user, where the data use request is used for requesting to use the target data of the user stored in the trusted hardware;

a second digital signature module, configured to perform digital signature on the target data by using the private key to obtain target data digital signature in response to the use authorization instruction of the use authorization approver of the target data corresponding to the data use request; and a third sending module, configured to send the target data digital signature to the data user.

Optionally, the apparatus in FIG. 3 can further include the following:

a sixth acquisition module, configured to obtain a setting operation of the user for a use authorization verification method of the trusted hardware;

a determination module, configured to determine the use authorization verification method of the trusted hardware based on the setting operation;

an identity verification module, configured to verify the identity on the current user by using the determined use authorization verification method if operation performed by the current user on the trusted hardware is identified; and a response module, configured to respond to the operation if the verification succeeds.

Figure 4:
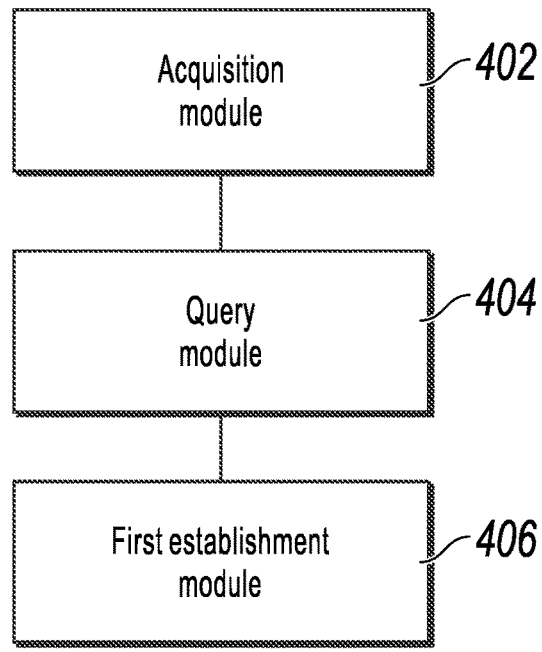
FIG. 4 is a schematic diagram illustrating a trusted hardware-based identity management apparatus corresponding to FIG. 2, according to some embodiments of the present specification.

The embodiments of the present specification further provide an apparatus corresponding to the previous method based on the same idea. FIG. 4 is a schematic diagram illustrating a trusted hardware-based identity management apparatus corresponding to FIG. 2, according to some embodiments of the present specification; As shown in FIG. 4, the apparatus can include the following:

an acquisition module 402, configured to obtain a DID binding request, where the DID binding request is generated based on the personal identity information of a user of trusted hardware and hardware identifier information of the trusted hardware, and the DID binding request is used for requesting to establish a corresponding relationship between a DID of the user and the trusted hardware;

a query module 404, configured to query the DID of the user in response to the DID binding request, where the DID of the user is established by the DIS and has a corresponding relationship with the personal identity information of the user; and a first establishment module 406, configured to establish the corresponding relationship between the DID of the user and the trusted hardware if the DID of the user is identified.

Optionally, the apparatus in FIG. 4 can further include the following:

a second establishment module, configured to create the DID of the user if the DID of the user is not identified; and a third establishment module, configured to establish a corresponding relationship between the created DID of the user and the trusted hardware.

Optionally, the acquisition module 402 can specifically be configured to:

obtain the DID binding request generated by the target application, where the DID binding request is used for requesting to establish a corresponding relationship between a target DID of the user and the trusted hardware, and the target DID is the DID registered by the user by using the target application.

The query module 404 can specifically be configured to: query the target DID.

Optionally, the apparatus in FIG. 4 can further include the following:

a key pair generation module, configured to generate a key pair for the trusted hardware;

a storage module, configured to store the public key in the key pair in the DID Doc of the user; and a sending module, configured to send the private key in the key pair to the trusted hardware.

The embodiments of the present specification further provide a device corresponding to the previous method based on the same idea.

Figure 5:
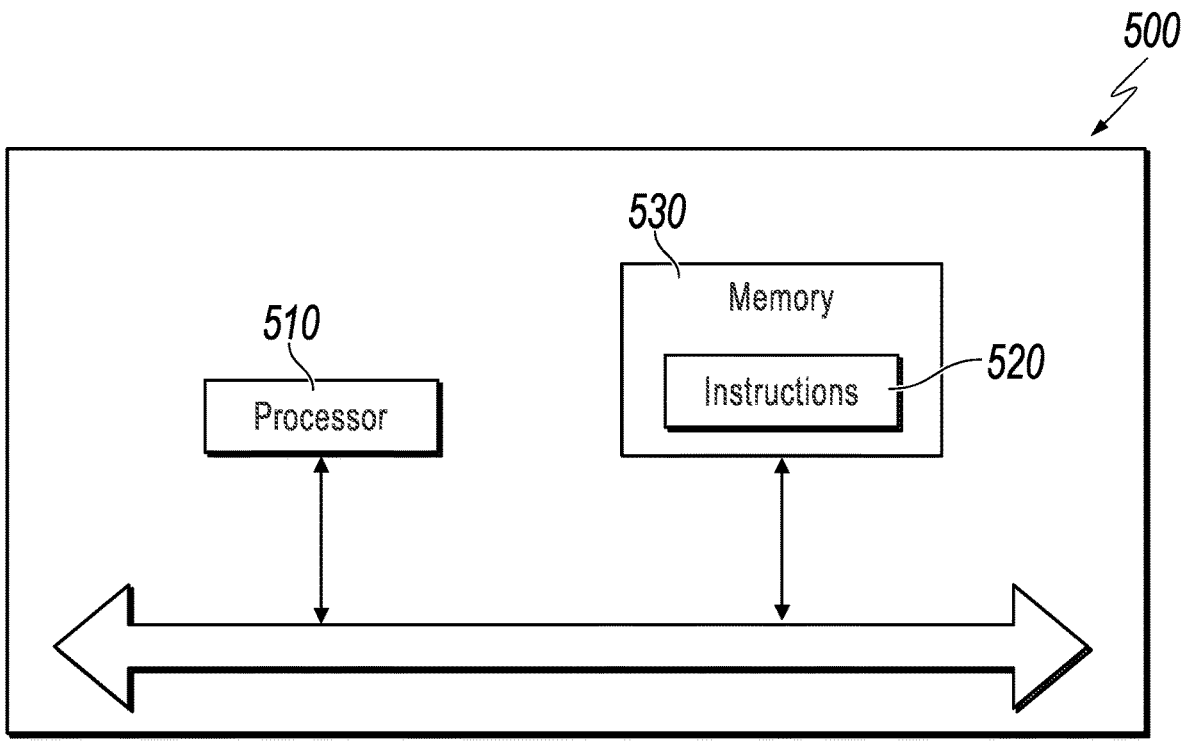
FIG. 5 is a schematic diagram illustrating a trusted hardware-based identity management device corresponding to FIG. 1, according to some embodiments of the present specification.

FIG. 5 is a schematic diagram illustrating a trusted hardware-based identity management device corresponding to FIG. 1, according to some embodiments of the present specification; As shown in FIG. 5, a device 500 can include the following:

at least one processor 510; and a memory 530 communicably coupled to the at least one processor, where the memory 530 stores instructions 520 that can be executed by the at least one processor 510, and the instructions are executed by the at least one processor 510, so that the at least one processor 510 can perform the following processes:

obtaining personal identity information of a user of trusted hardware;

obtaining hardware identifier information of the trusted hardware;

generating a DID binding request based on the personal identity information and the hardware identifier information, where the DID binding request is used for requesting to establish a corresponding relationship between a DID of the user and the trusted hardware; and sending the DID binding request to a DIS.

The embodiments of the present specification further provide a device corresponding to the previous method based on the same idea.

Figure 6:
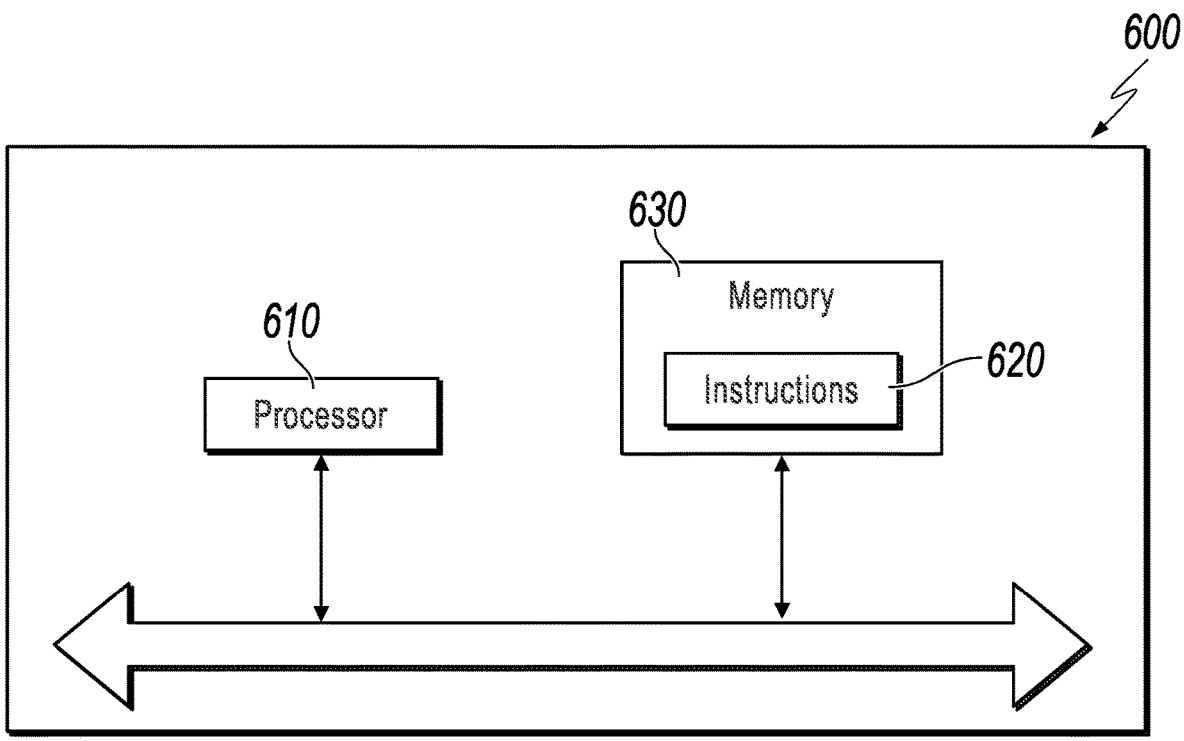
FIG. 6 is a schematic diagram illustrating a trusted hardware-based identity management device corresponding to FIG. 2, according to some embodiments of the present specification.

FIG. 6 is a schematic diagram illustrating a trusted hardware-based identity management device corresponding to FIG. 2, according to some embodiments of the present specification. As shown in FIG. 6, a device 600 can include the following:

at least one processor 610; and a memory 630 communicably coupled to the at least one processor, where the memory 630 stores instructions 620 that can be executed by the at least one processor 610, and the instructions are executed by the at least one processor 610, so that the at least one processor 610 can perform the following processes:

obtaining a DID binding request, where the DID binding request is generated based on personal identity information of a user of trusted hardware and hardware identifier information of the trusted hardware, and the DID binding request is used for requesting to establish a corresponding relationship between a DID of the user and the trusted hardware;

querying the DID of the user in response to the DID binding request, where the DID of the user is established by the DIS and has a corresponding relationship with the personal identity information of the user; and establishing the corresponding relationship between the DID of the user and the trusted hardware if the DID of the user is identified.

The embodiments in this specification are all described in a progressive manner. For same or similar parts in the various embodiments, mutual reference may be made. Each embodiment focuses on differences from other embodiments. Especially, the device shown in FIG. 5 and FIG. 6 is basically similar to a method embodiment, so the device is described briefly. Relevant parts can be referred to part description of the method embodiments.

In the 1990s, improvements to a technology could clearly distinguish between improvements in hardware (e.g., improvements of circuit structures such as diodes, transistors, and switches) and improvements in software (improvements of method flows). However, with the development of technologies, many improvements on the method processes nowadays can be regarded as direct improvements of hardware circuit structures. Designers almost obtain corresponding hardware circuit structures by programming an improved method processes into hardware circuits. Therefore, it is incorrect that an improvement of a method flow cannot be implemented with hardware entity modules. For example, a programmable logic device (PLD) (for example, a field programmable gate array (FPGA)) is such an integrated circuit with a logic function determined by programming devices by a user. It is programmed by a designer to "integrate" a digital system onto a PLD without requiring a chip manufacturer to design and manufacture application specific integrated circuit (ASIC) chips. Moreover, nowadays, instead of manually manufacturing integrated circuit chips, such programming is mostly implemented by using "logic compiler" software, which is similar to a software compiler used at the time of program development and writing, and original code to be compiled must also be written in a specific programming language, which is referred to as a hardware description language (HDL). There are many HDLs rather than one HDL, such as an advanced boolean expression language (ABEL), an Altera hardware description language (AHDL), Confluence, a Cornell university programming language (CUPL), HDCal, a Java hardware description language (JHDL), Lava, Lola, MyHDL, PALASM, and a Ruby hardware description language (RHDL). A very-high-speed integrated circuit hardware description language (VHDL) and Verilog are most commonly used at present. It will also be clear to those skilled in the art that a hardware circuit implementing the logic method flow can be readily obtained by only slightly logically programming and programming the method flow into an integrated circuit by using the previous several hardware description languages.

A controller can be implemented by any suitable method. For example, the controller can take the form of, for example, a microprocessor or processor and a computer readable medium storing computer readable program code (e.g., software or firmware) executable by the (micro) processor, logic gates, switches, application specific integrated circuit (ASICs), programmable logic controllers, and embedded micro controllers. Examples of the controller include, but are not limited to, the following micro controllers: ARC 625D, Atmel AT91SAM, Microchip PIC18F26K20, and Silicone Labs C8051F320. The memory controller can also be implemented as a part of the control logic of the memory. Those skilled in the art will also know that, in addition to implementing the controller in pure computer readable program code, it is possible to logically program the method steps so that the controller implements the same function in the form of logic gates, switches, ASICs, programmable logic controllers, embedded micro controllers, etc. Therefore, the controller can be regarded as a hardware component, and apparatuses, included in the controller, for realizing various functions can also be regarded as a structure inside the hardware component. Or even, the apparatus for realizing various functions can even be regarded as either a software module implementing the method or the structure inside the hardware component.

The systems, apparatuses, modules, or units illustrated in the previous embodiments can be specifically implemented by a computer chip or entity, or implemented by a product with a certain function. A typical implementation device is a computer. Specifically, the computer can be, for example, a personal computer, a laptop computer, a cell phone, a camera phone, a smart phone, a personal digital assistant, a media player, a navigation device, an E-mail device, a game console, a tablet computer, a wearable device, or any combination of these devices.

For ease of description, the apparatus is divided various units for describing respectively based on functions. Of course, the functions of the various units can be realized in one or more pieces of software and/or hardware when the present application is implemented.

Those skilled in the art should understand that the embodiments of the present disclosure can be provided as methods, systems, or computer program products. Therefore, the present disclosure can use a form of hardware only embodiments, software only embodiments, or embodiments combining software and hardware. Moreover, the present disclosure can use the form of a computer program product implemented on one or more computer available storage media (including, but not limited to, a disk memory, a CD-ROM, an optical memory, etc.) containing computer available program code.

The present disclosure is described with reference to the flowcharts and/or block diagrams of the methods, the devices (systems), and the computer program products according to the embodiments of the present disclosure. It should be understood that each method flow and/or block in the flowcharts and/or block diagrams and combinations of process and/or blocks in the flowcharts and/or block diagrams can be implemented by computer program instructions. These computer program instructions can be provided to a general-purpose computer, a special-purpose computer, an embedded processor, or a processor of another programmable data processing device to generate a machine, so that instructions executed by the computer or the processor of the another programmable data processing device produce an apparatus for implementing functions specified in one or more method flows in the flowcharts and/or one or more blocks in the block diagrams.

These computer program instructions can also be stored in a computer readable memory capable of guiding a computer or another programmable data processing device to work in a specific way, so that instructions stored in the computer readable memory produce a product including an instruction apparatus that implements functions specified in one or more method flows in the flowcharts and/or one or more blocks in the block diagrams.

These computer program instructions can also be loaded to a computer or another programmable data processing device, so that a series of operating steps are performed on the computer or the another programmable data processing device to produce a computer-implemented process, and therefore instructions executed on the computer or the another programmable data processing device provide steps for implementing functions specified in one or more method flows in the flowcharts and/or one or more blocks in the block diagrams.

In a typical configuration, the computer includes one or more central processing units (CPUs), an input/output interface, a network interface, and a memory.

The memory may include a non-persistent memory, a random access memory (RAM), and/or a non-volatile memory in a computer readable medium, such as a read-only memory (ROM) or a flash RAM. The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a ROM, an electrically erasable programmable ROM (EEPROM), a flash memory or another memory technology, a compact disc ROM (CD-ROM), a digital versatile disc (DVD), or another optical storage, a cassette, a magnetic disk storage, or another magnetic storage device or any other non-transmission medium. The computer storage medium can be configured to store information that can be accessed by a computing device. As described in the present application, the computer readable medium does not include computer readable transitory media such as a modulated data signal and a carrier.

It is also worthwhile to note that the terms "include", "contain" or any other term variations are intended to cover a non-exclusive inclusion, so that a process, method, item, or device including a series of elements includes not only those elements but also other elements not explicitly listed, or elements that are inherent to such process, method, product, or device. In the absence of more restrictions, elements described by the phrase "include a/an . . . " do not exclude the existence of additional identical elements in the process, method, product, or device that includes the elements.

Those skilled in the art should understand that the embodiments of the present application can be provided as methods systems or computer program products. Therefore, the embodiments of the present application can adopt forms of complete hardware embodiments, complete software embodiments or embodiments integrating software and hardware. Moreover, the present application can adopt the form of a computer program product implemented on one or more computer available storage media (including, but not limited to, a disk memory, a CD-ROM, an optical memory, etc.) containing computer available program code.

The present application can be described in the general context of computer executable instructions, such as program modules, executed by a computer. Generally, the program modules include routines, programs, objects, components, data structures, etc. that perform particular tasks or implement particular abstract data types. The present application can also be practiced in distributed computing environments where tasks are performed by remote processing devices that are connected through a communications network. In the distributed computing environments, the program modules can be located in both local and remote computer storage media including storage devices.

The previous descriptions are only embodiments of the present application, and are not intended to limit the present application. Various changes and variations of the present application will occur to those skilled in the art. Any modifications, equivalent substitutions, improvements, etc. that come within the spirit and principles of the present application are intended to be included within the scope of the claims of the present application.

What is claimed is:

1. A computer-implemented method, comprising:
   determining personal identity information of a user of a trusted hardware;
   determining hardware identifier information of the trusted hardware;
   generating, by a target application, a decentralized identifier (DID) binding request based on the personal identity information, the hardware identifier information, and application identification information obtained during registration of a target DID registered by the user, wherein the DID binding request is configured to request to establish a corresponding relationship between the trusted hardware and the target DID using the target application;
   sending the DID binding request to a decentralized identity service (DIS);
   receiving a private key from the DIS, wherein the private key and a corresponding public key are generated by the DIS based on the corresponding relationship, and wherein the public key is stored in a DID document of the user; and
   storing the private key in the trusted hardware.

2. The computer-implemented method according to claim 1, comprising:
   obtaining a data use request sent by a data user, wherein the data use request is configured to request, by the trusted hardware, target data managed by the user, and wherein the target data is obtained by processing, by a trusted application (TAPP), user service data of the user at a trusted institution;
   generating, in response to the data use request, use authorization information in response to a use authorization instruction from a use authorization approver of the target data;
   digitally signing the use authorization information by using the private key to obtain digitally signed use authorization information; and
   sending the digitally signed use authorization information to the TAPP.

3. The computer-implemented method according to claim 2, wherein the TAPP is comprised in a trusted execution environment (TEE) in a target device, and wherein the TEE is isolated from an operating system of the target device.

4. The computer-implemented method according to claim 3, wherein the TAPP identifies the user service data of the user from the trusted institution through an interface of the TEE.

5. The computer-implemented method according to claim 1, comprising:
   obtaining a data use request sent by a data user, wherein the data use request is configured to request target data of the user stored in the trusted hardware;
   digitally signing, to obtain digitally signed target data in response to a use authorization instruction from a use authorization approver of the target data, the target data of the user stored in the trusted hardware with the private key; and
   sending the digitally signed target data to the data user.

6. The computer-implemented method according to claim 1, comprising:
   obtaining a setting operation of the user for a use authorization verification method of the trusted hardware; and
   determining the use authorization verification method of the trusted hardware based on the setting operation.

7. The computer-implemented method according to claim 6, comprising:
   verifying an identity of a current user by using the use authorization verification method in response to identifying an operation performed by the current user on the trusted hardware; and
   responding to the operation in response to the identity of the current user being successfully verified.

8. A non-transitory, computer-readable medium storing one or more instructions executable by a computer system to perform operations comprising:
   determining personal identity information of a user of a trusted hardware;
   determining hardware identifier information of the trusted hardware;
   generating, by a target application, a decentralized identifier (DID) binding request based on the personal identity information, the hardware identifier information, and application identification information obtained during registration of a target DID registered by the user, wherein the DID binding request is configured to request to establish a corresponding relationship between the trusted hardware and the target DID using the target application;
   sending the DID binding request to a decentralized identity service (DIS);
   receiving a private key from the DIS, wherein the private key and a corresponding public key are generated by the DIS based on the corresponding relationship, and wherein the public key is stored in a DID document of the user; and
   storing the private key in the trusted hardware.

9. The non-transitory, computer-readable medium according to claim 8, comprising:
   obtaining a data use request sent by a data user, wherein the data use request is configured to request, by the trusted hardware, target data managed by the user, and wherein the target data is obtained by processing, by a trusted application (TAPP), user service data of the user at a trusted institution;
   generating, in response to the data use request, use authorization information in response to a use authorization instruction from a use authorization approver of the target data;
   digitally signing the use authorization information by using the private key to obtain digitally signed use authorization information; and
   sending the digitally signed use authorization information to the TAPP.

10. The non-transitory, computer-readable medium according to claim 9, wherein the TAPP is comprised in a trusted execution environment (TEE) in a target device, and wherein the TEE is isolated from an operating system of the target device.

11. The non-transitory, computer-readable medium according to claim 10, wherein the TAPP identifies the user service data of the user from the trusted institution through an interface of the TEE.

12. The non-transitory, computer-readable medium according to claim 8, comprising:
 obtaining a data use request sent by a data user, wherein the data use request is configured to request target data of the user stored in the trusted hardware;
 digitally signing, to obtain digitally signed target data in response to a use authorization instruction from a use authorization approver of the target data, the target data of the user stored in the trusted hardware with the private key; and
 sending the digitally signed target data to the data user.

13. The non-transitory, computer-readable medium according to claim 8, comprising:
 obtaining a setting operation of the user for a use authorization verification method of the trusted hardware; and
 determining the use authorization verification method of the trusted hardware based on the setting operation.

14. The non-transitory, computer-readable medium according to claim 13, comprising:
 verifying an identity of a current user by using the use authorization verification method in response to identifying an operation performed by the current user on the trusted hardware; and
 responding to the operation in response to the identity of the current user being successfully verified.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
 determining personal identity information of a user of a trusted hardware;
 determining hardware identifier information of the trusted hardware;
 generating, by a target application, a decentralized identifier (DID) binding request based on the personal identity information, the hardware identifier information, and application identification information obtained during registration of a target DID registered by the user, wherein the DID binding request is configured to request to establish a corresponding relationship between the trusted hardware and the target DID using the target application;
 sending the DID binding request to a decentralized identity service (DIS);
 receiving a private key from the DIS, wherein the private key and a corresponding public key are generated by the DIS based on the corresponding relationship, and wherein the public key is stored in a DID document of the user; and
 storing the private key in the trusted hardware.

\* \* \* \* \*